US011168098B2

(12) United States Patent
Roberts et al.

(10) Patent No.: US 11,168,098 B2
(45) Date of Patent: Nov. 9, 2021

(54) METHOD FOR PREPARING ALKYLALKOXYSILANES

(71) Applicant: Dow Silicones Corporation, Midland, MI (US)

(72) Inventors: John Roberts, Midland, MI (US); Vladimir Pushkarev, Mount Pleasant, MI (US); Dimitris Katsoulis, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/261,592

(22) PCT Filed: Aug. 21, 2019

(86) PCT No.: PCT/US2019/047376
§ 371 (c)(1),
(2) Date: Jan. 20, 2021

(87) PCT Pub. No.: WO2020/050976
PCT Pub. Date: Mar. 12, 2020

(65) Prior Publication Data
US 2021/0292346 A1 Sep. 23, 2021

Related U.S. Application Data

(60) Provisional application No. 62/728,090, filed on Sep. 7, 2018.

(51) Int. Cl.
| C07F 7/18 | (2006.01) |
| C07F 7/08 | (2006.01) |
| B01J 35/02 | (2006.01) |
| B01J 37/00 | (2006.01) |
| B01J 37/08 | (2006.01) |
| B01J 21/06 | (2006.01) |

(52) U.S. Cl.
CPC ............. *C07F 7/188* (2013.01); *B01J 21/06* (2013.01); *B01J 35/023* (2013.01); *B01J 37/0036* (2013.01); *B01J 37/08* (2013.01); *C07F 7/0834* (2013.01)

(58) Field of Classification Search
None
See application file for complete search history.

(56) References Cited

U.S. PATENT DOCUMENTS

| 2,473,260 | A | 6/1949 | Rochow |
| 3,641,077 | A | 2/1972 | Rochow |
| 4,088,669 | A | 5/1978 | Malek et al. |
| 4,593,114 | A | 6/1986 | Lewis et al. |
| 4,602,101 | A | 7/1986 | Halm et al. |
| 4,762,940 | A | 8/1988 | Halm et al. |
| 4,778,910 | A | 10/1988 | Stoffer et al. |
| 4,898,960 | A | 2/1990 | Dosaj et al. |
| 4,945,978 | A | 8/1990 | Herrmann |
| 4,962,220 | A | 10/1990 | Halm et al. |
| 4,965,388 | A | 10/1990 | Halm et al. |
| 4,966,986 | A | 10/1990 | Halm et al. |
| 5,059,343 | A | 10/1991 | Halm et al. |
| 5,596,119 | A | 1/1997 | Halm et al. |
| 7,645,894 | B2 | 1/2010 | Kanner |
| 7,652,164 | B2 | 1/2010 | Lewis et al. |
| 8,410,297 | B2 | 4/2013 | Kohane et al. |
| 8,962,877 | B2 | 2/2015 | Kohane et al. |

FOREIGN PATENT DOCUMENTS

| EP | 1078930 | 2/2001 |
| JP | S26286 | 1/1951 |
| JP | 2009269788 A | 11/2009 |
| JP | 2015000850 | 1/2015 |
| WO | 2014143289 | 9/2014 |

OTHER PUBLICATIONS

U.S. Reissue 33452, publication date Nov. 20, 1990, Assignee General Electric Company.
Eisenberg, et al., "The iridium complex catalyzed reduction of carbon dioxide to methoxide by alkylsilanes", Organometallics, American Chemical Society, US, vol. 8, No. 7 Dec. 31, 1989, pp. 1822-1824.
Encyclopedia of Polymer Science and Technology, John Wiley and Sons, "Silicones", vol. 11, pp. 765-841.
Lewis, et al., "Direct Formation of Ge—C Bonds from GeO2", JACS, 2002, p. 124, p. 11718-11722.
Lewis, et al., "Reaction of Silicate Minerals to Form Tetramethoxysilane +", Inorganic Chemistry, vol. 41, No. 9, May 1, 2002, p. 2608-2615.
Newton, et al. "The Direct Synthesis of Organic Derivatives of Silicon Using Nonhalogenated Organic Compounds" Inorganic Chemistry, vol. 9, May 5, 1970, p. 1071-1075.
Okamoto, et al., "Deoligomerization of siloxanes with dimethyl carbonate over solid-base catalysts", Chemical Communications, No. 18, Jan. 1, 2001, p. 1838-1839.
Schattenmann, et al., New Route from Si—O to Si—C Bonds: Alkylalkoxysilanes from Alkoxysilanes and Metal Hydrides, Organometallics, 2004, 23 , pp. 6202-6204.
Suzuki, et al., "Direct transformation of silica into alkoxysilanes by gas-solid reactions", Journal of the Chemical Society, Chemical Communications, Royal Society of Chemistry, GB, No. 2, Jan. 15, 1992, p. 136-137.

*Primary Examiner* — Clinton A Brooks
(74) *Attorney, Agent, or Firm* — Catherine U. Brown

(57) ABSTRACT

A method is useful for preparing alkylalkoxysilanes, such as alkylalkoxysilanes, particularly dimethyldimethoxysilane. The method includes heating at a temperature of 150° C. to 400° C., ingredients including an alkyl ether and carbon dioxide, and a source of silicon and catalyst. The carbon dioxide eliminates the need to add halogenated compounds during the method.

18 Claims, No Drawings

METHOD FOR PREPARING ALKYLALKOXYSILANES

CROSS-REFERENCE TO RELATED APPLICATIONS

This application is a U.S. national stage filing under 35 U.S.C. § 371 of PCT Application No. PCT/US2019/047376 filed on 21 Aug. 2019, which claims the benefit of U.S. Provisional Patent Application No. 62/728,090 filed 7 Sep. 2018 under 35 U.S.C. § 119 (e). PCT Application No. PCT/US2019/047376 and U.S. Provisional Patent Application No. 62/728,090 are hereby incorporated by reference.

TECHNICAL FIELD

Alkylalkoxysilanes, can be prepared by direct synthesis by contacting an alkyl ether and carbon dioxide with a catalyzed source of silicon. The method may avoid the need to use halogenated compounds in the production of alkylalkoxysilanes.

BACKGROUND

Alkylalkoxysilanes (e.g., dimethyldimethoxysilane, methyltrimethoxysilane, and trimethylmethoxysilane) are intermediates in the silicones industry useful for the production of various silicone fluids and resins. Alkylalkoxysilanes can be produced commercially by alkoxylation of alkylhalosilanes. When an alkylhalosilane reacts with an alcohol, the resulting alkoxylation reaction produces an alkylalkoxysilane product and a hydrogen halide by-product.

Typically, alkylhalosilanes are produced commercially by the Mueller-Rochow Direct Process, which comprises passing a halogenated hydrocarbon, such as methyl chloride, over zero-valent silicon in the presence of a catalyst and various promoters to produce a mixture of alkylhalosilanes. A typical commercial process to make zero-valent silicon comprises the carbothermic reduction of $SiO_2$ in an electric arc furnace at extremely high temperatures.

In addition to the Direct Process, alkylhalosilanes have been produced by the alkylation of silicon tetrachloride and various alkylchlorosilanes by passing the vapors of these chlorosilanes together with an alkyl halide over finely divided aluminum or zinc at elevated temperatures. However, this process results in the production of a large amount of by-product aluminum chloride or zinc chloride, which is costly to dispose of on a commercial scale.

Alternatively, alkylalkoxysilanes have been produced in the past by reacting silicon metal with an alkyl ether in the presence of a halogenated compound such as a halosilane or a halide of formula R'X, where X is a halogen atom and R' is a hydrogen atom or a hydrocarbyl group. Such halide compounds are exemplified by hydrogen halides such as HCl and hydrocarbon halides such as methyl chloride or methyl bromide. However, processes employing halosilanes or hydrogen halides may suffer from the drawback of poor ability to run on a commercial scale. And, processes employing alkyl halides suffer from the drawback of producing alkylhaloalkoxysilanes, rather than complete reaction to alkylalkoxysilanes.

There is an industry need to produce alkylalkoxysilanes via methods that minimize or eliminate the use of halogenated compounds and/or minimize production of undesirable by-products.

SUMMARY

A method for preparing an alkylalkoxy comprises:
1) heating at a temperature of 150° C. to 400° C., ingredients comprising
   a) an alkyl ether and carbon dioxide, and
   b) a catalyzed source of silicon, and optionally c) hydrogen;

thereby forming a reaction product comprising the alkyl alkoxysilane, where the alkylalkoxysilane has formula $R_{(4-a)}Si(OR)_a$, where each R is independently an alkyl group and subscript a is 1 to 4.

DETAILED DESCRIPTION

The inventors surprisingly found that when an alkyl ether and carbon dioxide are contacted with a catalyzed source of silicon in the method described above, desirable alkylalkoxysilane can be obtained in the absence of halogenated compounds. The method can provide the benefit that alkylalkoxysilane can be formed, and undesirable alkylhaloalkoxysilanes are not formed, particularly when the ingredients are free of halogenated compounds. The phrase, "the ingredients are free of halogenated compounds" means that in step 1), the ingredients used in the method described above contain no, or non-detectable amounts of, halosilanes and halide compounds of formula R'X, where R' is a hydrogen atom or a hydrocarbyl group and X is a halogen atom, as measured by GC-MS. The phrase "in the absence of halogenated compounds" as used herein, means that no halogenated compounds selected from halosilanes and halide compounds of formula R'X, as described above, are intentionally added during any method step described herein.

Alkyl ethers suitable for use in ingredient a) in the method described herein are commercially available. The alkyl ether may have formula: $R^1$—O—$R^2$, where each $R^1$ and each $R^2$ are independently an alkyl group. $R^1$ and $R^2$ may be the same or different alkyl groups. Alternatively, $R^1$ and $R^2$ may be the same alkyl group. The alkyl groups for $R^1$ and $R^2$ may each have 1 to 10 carbon atoms, alternatively 1 to 6 carbon atoms, and alternatively 1 to 4 carbon atoms. Alkyl groups containing at least three carbon atoms may have a branched or unbranched structure. Alternatively, $R^1$ and $R^2$ may each be Me, Et, Pr, Bu, or hexyl. Alternatively, $R^1$ and $R^2$ may each be Me or Et. Alternatively, $R^1$ and $R^2$ may each be Me. Examples of hydrocarbyl ethers useful in the method described herein include dimethyl ether, diethyl ether, and methyl ethyl ether, and they are commercially available from Sigma-Aldrich.

The carbon dioxide ($CO_2$) used in ingredient a) is also commercially available. The amounts of alkyl ether and $CO_2$ will depend on various factors including the type of reactor selected for performance of the method and the selections for ingredients a) and b). However, the amount of alkyl ether may be 50 mol %/hour to 150 mol %/hour, alternatively 90 mol %/hour, based on the amount of silicon in ingredient b). The amount of CO2 may be 100 mol %/hour to 200 mol %/hour, alternatively 150 mol %/hour, based on the amount of silicon in ingredient b).

Ingredient b) is a catalyzed source of silicon. The silicon in ingredient b) is reactive with ingredient a). Ingredient b) may be a copper silicide or a contact mass such as that used in the Mueller-Rochow Direct Process, described above, which comprises silicon metal and a catalyst such as copper.

In one embodiment, ingredient b) is a copper silicide. The copper silicide used as ingredient b) in the method described above may have an empirical formula $Cu_zSi_yAl_xSn_wTi_v$, where subscripts z, y, x, w, and v represent the molar amounts of each element present, and z>0, y>0, x≥0, w≥0, and v=0, with the proviso that z>y. Alternatively, 2.5≤z≤8, and y=1. When x=w=v=0, then the copper silicide is a binary copper silicide. Alternatively, 3<z≤7 and y=1.

The copper silicide useful in the method may be a binary copper silicide, which is commercially available. "Binary copper silicide" means a material including both silicon and copper that are intermixed at an atomic level, and the arrangement of the atoms can be described using well known crystallographic principles and models. Example phases of binary copper silicides are found in the phase diagram (Okamoto H., J. Phase. Equilib., Vol. 23, 2002, p 281-282) and include, but are not limited to: $Cu_{0.88}Si_{0.12}$, $Cu_{0.85}Si_{0.15}$, $Cu_{0.83}Si_{0.17}$, $Cu_{4.15}Si_{0.85}$, $Cu_{15}Si_{4}$, and $Cu_{3.17}Si$. In addition, binary copper silicide may further include Cu and Si individually, provided that the amount of Cu present is not sufficient to cause sintering in the method described herein. Exemplary binary copper silicides include, but are not limited to, $Cu_7Si$, $Cu_5Si$, $Cu_4Si$, and $Cu_3Si$. Other exemplary binary copper silicides include, but are not limited to, κ-$Cu_7Si$, γ-$Cu_5Si$, δ-$Cu_{4.88}Si$, ε-$Cu_4Si$, and η-$Cu_3Si$. Other exemplary binary copper silicides include, but are not limited to η-$Cu_3Si$, η'-$Cu_3Si$, η"-$Cu_3Si$, η-$Cu_{3.17}Si$, η'-$Cu_{3.17}Si$, and η"-$Cu_{3.17}Si$. Alternatively, the binary copper silicide may be $Cu_5Si$.

In one embodiment, the ingredients consist of ingredient a) and binary copper silicide, i.e., without hydrogen, used as ingredient b). In this embodiment, the binary copper silicide is typically at least 99.0% pure, alternatively 99.5% pure, or greater. The binary copper silicide may be 99.0% pure to 99.99% pure, alternatively 99.5% pure to 99.9% pure.

Alternatively, when ingredient b) is a copper silicide, the copper silicide may further comprise an additional metal, i.e., a different metal included in addition to copper and silicon. In this instance, the additional metal may act as a co-catalyst even though it is incorporated into the copper silicide, and the copper silicide may be ternary or higher. The additional metal may be selected from aluminium (Al), tin (Sn), titanium (Ti), or a combination of two or more of Al, Sn, and Ti. This copper silicide may have an empirical formula $Cu_bSi_cAl_dSn_eTi_f$ where subscripts b, c, d, e, and f, represent the molar amounts of each element present, and b>0, c>0, d≥0, e≥0, and f≥0; with the provisos that at least one of d, e, and f is not 0. In this copper silicide, b>c. Alternatively, 2.5≤b≤8, c=1, and one of d, e, and f is greater than 0. Alternatively, the additional metal may be selected from the group consisting of Al and Sn. Alternatively, the additional metal may be Al. Alternatively, the additional metal may be Sn. Alternatively, the copper silicide may have formula $(M)_i(Cu_kSi)_j$, where M is the additional metal selected from Al, Sn, and Ti. Subscript i represents the molar amount of additional metal, and 0<i≤1. Subscript k represents the molar amount of copper relative to silicon, and 2.5≤k≤8. Alternatively, 3≤k≤5. Subscript j represents the molar amount of copper and silicon collectively, relative to the amount of the additional metal, and j has a value sufficient that a quantity (i+j)=100. Exemplary copper silicides in this embodiment include ternary intermetallic compounds of Cu, Si, and Al; of Cu, Si, and Sn; and of Cu, Si, and Ti. Alternatively, the copper silicide in this embodiment may have formula $(M_m:Cu_{(1-m)})_nSi$, where M is as described above, subscript 0<m≤0.01; alternatively 0.001≤m≤0.01 and 2.5≤n≤8. Alternatively, M is selected from the group consisting of Al, Sn, and Ti. Alternatively, M is selected from the group consisting of Al and Sn. Alternatively, M is Sn. Alternatively, M is Al. Exemplary copper silicides of this formula include $(Al_{0.01}Cu_{0.99})_5Si$, $(Sn_{0.01}Cu_{0.99})_5Si$, $(Ti_{0.01}Cu_{0.99})_5Si$, $(Al_{0.01}Cu_{0.99})_4Si$, $(Sn_{0.01}Cu_{0.99})_4Si$, and $(Ti_{0.01}Cu_{0.99})_4Si$. These copper silicides are commercially available. Alternatively, they may be prepared by conventional methods, such as from the melt of the individual elements at predetermined stoichiometry using a heating apparatus such as electric arc melter. Alternatively, the ternary copper silicides including an additional metal may be prepared by a method comprising vacuum impregnating copper halide and another metal halide on silicon particles thereby producing a mixture, and mechanochemically processing the mixture under an inert atmosphere, thereby producing a reaction product comprising the ternary copper silicides. The copper silicides described above may be prepared in this manner.

Alternatively, the method may further comprise adding ingredient d) a promoter or co-catalyst. Ingredient d) may be used, for example, in the embodiment in which a binary copper silicide is used as ingredient b). In this embodiment, ingredient d) may be a separate metal or compound added with the copper silicide, i.e., not a metal incorporated in the ternary or higher copper silicide. Ingredient d) may be selected from Al, tin Sn, titanium (Ti), or a combination of two or more of Al, Sn, and Ti. The catalyst may be metallic, e.g., metallic Sn or metallic Al. Alternatively, the catalyst may comprise one or more compound of Al, Sn, or Ti. Such compounds are exemplified by halides, e.g., chlorides such as aluminium chloride ($AlCl_3$), stannous chloride ($SnCl_2$), and stannic chloride ($SnCl_4$), and/or zinc chloride ($ZnCl_2$); oxides such as stannous oxide ($SnO_2$); and phosphides. The amount of ingredient d) can vary depending on the type and amount of species selected from the catalyst and desired distribution of the alkylalkoxysilane species produced. However, the amount of catalyst may range from 1000 ppm to 3%, alternatively 0.5% to 3%, alternatively 1% to 3%, and alternatively 1% to 2%, based on the weight of ingredient b).

In an alternative embodiment, ingredient b) is a contact mass such as that used in the Mueller-Rochow Direct Process. The contact mass comprises silicon metal, a catalyst, and optionally a promoter (such as ingredient d), described above). The catalyst may be copper, silver or nickel, alternatively copper. Any form of copper, silver, or nickel may be used. For example, when the catalyst is copper, the catalyst may be selected from elemental copper, copper alloys, copper compounds, and mixtures thereof. Examples of the copper compounds include, but are not limited to, granular copper powder, stamped copper, cuprous oxide, cupric oxide, cupric chloride, cuprous chloride, copper nitride, copper hydroxide, copper formate, and mixtures of two or more of the preceding copper compounds. Methods of making such copper compounds are known in the art, and the compounds are available commercially. The contact mass may include an amount of copper or copper compound sufficient to provide 2 ppm to 10%, alternatively 0.2% to 10% of elemental copper based on the weight of elemental silicon in the contact mass.

The promoter can be any element or its compounds that accelerate or catalyze the Direct Process. Promoters include, but are not limited to, phosphorous, phosphorous compounds, zinc, zinc compounds, tin, tin compounds, antimony, antimony compounds, arsenic, arsenic compounds, cesium, cesium compounds, aluminium and aluminium compounds, calcium, calcium compounds, titanium, titanium compounds, and mixtures of at least two of the preceding promoters. Alternatively, the promoter may comprise one or more elements selected from zinc, tin, iron, phosphorous and aluminium. One or more promoters may be present in the contact mass in amounts such that elemental phosphorus may be present in amounts of up to 2500 ppm, alternatively 250 to 2500 ppm based on the weight of the silicon in the contact mass. Elemental tin may be present in an amount of up to 200 ppm, alternatively 5 ppm to 200 ppm, based on the weight of silicon in the contact mass. Elemental aluminium and elemental iron may each be present in amounts up to 1%, alternatively 0.02% to 1%, based on the weight of silicon in the contact mass. Elemental zinc may be present in an amount up to 10,000 ppm, alternatively 100 to 10,000 ppm based on the weight of silicon in the contact mass. Exemplary phosphorus promoters include elemental phosphorus, metal phosphides such as zinc phosphide. Certain compounds may include more than one promoter, such as tin phosphide. Alternatively, catalyst and promoter may be provided in one compound, such as when a copper-zinc alloy such as brass, a copper-antimony alloy, or a copper-phosphorous alloy, such as cuprous phosphide, is combined with silicon metal to form the contact mass.

When promoter is present, the combination of catalyst and promoter may be present in the contact mass in a combined amount of 3 ppm to 10% based on the weight of silicon metal in the contact mass, alternatively 3 ppm to 5%. One skilled in the art would recognize that metallurgical grade silicon used in preparation of the contact mass may contain one or more impurities that act as a catalyst and/or a promoter as described above. Examples of contact masses and how to make them are described in patents, for example, U.S. Pat. Nos. 8,962,877; 5,596,119; 5,059,343; 4,966,986; 4,965,388; 4,962,220; 4,946,978; 4,898,960; 4,762,940; 4,602,101; and U.S. Re. 33,452. In one embodiment, ingredient b) is a contact mass comprising silicon, copper, and tin.

The method can be performed in any reactor suitable for the combining of gases and solids or any reactor suitable for the combining of liquids and solids. For example, the reactor configuration can be a batch vessel, packed bed, stirred bed, vibrating bed, moving bed, re-circulating beds, or a fluidized bed. Alternatively, the reactor for may be a packed bed, a stirred bed, or a fluidized bed. To facilitate reaction, the reactor may have means to control the temperature of the reaction zone, i.e., the portion of the reactor in which the ingredients are in contact.

The temperature of the reactor in which the ingredients are contacted is at least 150° C., alternatively 150° C. to 400° C.; alternatively 200° C. to 350° C.; alternatively 200° C. to 300° C.; alternatively 250° C. to 350° C.; alternatively 350° C. to 400° C.; alternatively 370° C. to 400° C.; and alternatively 300° C. to 400° C. Without wishing to be bound by theory, it is thought that if temperature is less than 150° C., then the reaction may not proceed at a sufficient speed to produce the desired product; and if the temperature is greater than 400° C., then ingredient a) and/or alkylalkoxysilanes in the reaction product may decompose.

The pressure at which the ingredients are contacted can be sub-atmospheric, atmospheric, or super-atmospheric. For example, the pressure may range from greater than 0 kilopascals absolute (kPa) to 2000 kPa; alternatively 100 kPa to 1000 kPa; and alternatively 101 kPa to 800 kPa.

The mole ratio of ingredient a) to ingredient b) may range from 10,000:1 to 0.01:1, alternatively 100:1 to 1:1, alternatively 20:1 to 5:1, alternatively 20:1 to 4:1, alternatively 20:1 to 2:1, alternatively 20:1 to 1:1, and alternatively 4:1 to 1:1. The amounts of ingredient a) and ingredient b) are sufficient to provide the mole ratio described above.

The residence time for ingredient a) is sufficient for the ingredient a) to contact ingredient b) and form the reaction product. For example, a sufficient residence time may be at least 0.01 s, alternatively at least 0.1 s, alternatively 0.1 s to 10 min, alternatively 0.1 s to 1 min, and alternatively 0.5 s to 10 s. The desired residence time may be achieved by adjusting the flow rate of ingredient a), or by adjusting the total reactor volume, or by any combination thereof.

Ingredient b) is used in a sufficient amount. A sufficient amount of ingredient b) is enough to form the reaction product, when ingredient a) is contacted with ingredient b). The exact amount of ingredient b) depends upon various factors including the type of reactor used (e.g., batch or continuous), the residence time, temperature, the molar ratio of ingredient a) to ingredient b), and the particular species selected for ingredient a) used. However, a sufficient amount of ingredient b) may be at least 0.01 milligram per cubic centimeter ($mg/cm^3$) of reactor volume; alternatively at least 0.5 $mg/cm^3$ of reactor volume, and alternatively 1 $mg/cm^3$ of reactor volume to the maximum bulk density of the ingredient b), alternatively 1 $mg/cm^3$ to 5,000 $mg/cm^3$ of reactor volume, alternatively 1 $mg/cm^3$ to 1,000 $mg/cm^3$ of reactor volume, and alternatively 1 $mg/cm^3$ to 900 $mg/cm^3$ of reactor volume.

There is no upper limit on the time for which the method is conducted. Without wishing to be bound by theory, it is thought that the method may be performed indefinitely to make the reaction product as ingredient a) is contacted with ingredient b). For example, the method may conducted for at least 0.1 s, alternatively 1 s to 30 hours (h), alternatively 1 s to 5 h, alternatively 1 min to 30 h, alternatively 3 h to 30 h, alternatively 3 h to 8 h, and alternatively 3 h to 5 h.

The method described herein may also comprise purging before contacting the ingredients. Purging may be conducted to remove unwanted gaseous or liquid materials. Unwanted materials are, for example, air, $O_2$ and/or $H_2O$. Purging may be accomplished with a gas such as argon (Ar), helium (He), hydrogen ($H_2$), and/or nitrogen ($N_2$); alternatively $H_2$; alternatively an inert gas such as Ar, He, and/or $N_2$. Purging may be performed by feeding the gas into the reactor at ambient or elevated temperature, such as 25° C. to 300° C.

The method may further comprise vaporizing ingredient a), such as by known methods, e.g., heating or passing a carrier gas through a reservoir containing ingredient a), before contacting with ingredient b).

The method may further comprise recovering the reaction product, for example, to purify one or more of the alkylalkoxysilanes in the reaction product produced by the method. The reaction product may be recovered by, for example, removing gaseous reaction product and any other vapors from the reaction product followed by condensation of the vapors and/or isolation of one or more compounds from any other compounds in the reaction product by a technique such as solvent extraction and/or distillation.

The alkylalkoxysilanes produced by the present method may have formula $R_{(4-a)}Si(OR)_a$, where each R is independently an alkyl group and subscript a is 1 to 4. The alkyl groups for R may each have 1 to 10 carbon atoms, alternatively 1 to 6 carbon atoms, and alternatively 1 to 4 carbon atoms. Alkyl groups are exemplified by Me, Et, Pr, and Bu. Alkyl groups containing at least three carbon atoms may have a branched or unbranched structure. Alternatively, each R may be independently selected from Me, Et, or Pr. Alternatively, each R may be Me or Et. Alternatively, each R may be Me. Examples of alkylalkoxysilanes produced by the present method include dimethyldiethoxysilane ($Me_2Si(OEt)_2$), trimethylmethoxysilane ($Me_3SiOMe$), diethyldimethoxysilane ($Et_2Si(OMe)_2$), dimethyldimethoxysilane ($Me_2Si(OMe)_2$), methyltrimethoxysilane ($MeSi(OMe)_3$), tetramethoxysilane (TMOS), and combinations of two or more of $Me_2Si(OEt)_2$, $Me_3SiOMe$, $Me_2Si(OEt)_2$, $Me_2Si$ (OMe)$_2$, MeSi(OMe)$_3$, and TMOS. Alternatively, the product may comprise methyltrimethoxysilane, dimethyldimethoxysilane, trimethylmethoxysilane, and tetramethoxysilane.

The alkylalkoxysilanes (such as alkylalkoxysilanes) may be used as reactants to make polyorganosiloxane resins with crosslinked siloxane networks. Such polyorganosiloxane resins are useful, for example, for making high temperature coatings, as thermal and electrical insulating coatings, as hydrophobic coatings, and/or as matrices for fiber reinforced composites. Dialkyldialkoxysilanes, such as dimethyldimethoxysilane, are useful as reactants for producing polydialkylsiloxane polymers, such as polydimethylsiloxanes.

EXAMPLES

These examples are intended to illustrate some embodiments of the invention and should not be interpreted as limiting the scope of the invention set forth in the claims. Copper silicide of formula Cu$_5$Si with 99.5% purity was purchased from Alfa Aesar. Cu$_5$Si with 97% purity was purchased from Gelest.

Reference Example 1—Copper Silicide Preparation

Copper silicide ingots were prepared by high temperature melting of the precursor materials using a MRF model SA200 laboratory arc-melter. The general formula was M$_5$Si with M being either pure Cu or a mixture of copper with an additional metal other than copper in a ratio of copper to the other metal of 99:1, atomic ratio. The appropriate weight quantities of the precursor materials were mixed together and placed into an oxygen-free copper crucible. The process of forming the silicide was performed under Argon (Ar) atmosphere (80-90 kPa) using a standard ceriated tungsten electrode in three one minute sessions. Between the sessions the sample ingot was cooled to below 200° C., removed, surface cleaned and placed upside down back into the crucible. The subsequent repeated re-melting of the crucible contents assured a good homogeneity of the final copper silicide ingot, which was first confirmed by a visual inspection of the ingot and then by the XRD characterization. The interaction between the melt and the crucible was minimal, as no wetting of the crucible surface by the melt was observed during the synthesis.

The copper silicide ingots were crushed with a vise to small chunks. The crushed ingots were then ground in air for 10 minutes using a Spex SamplePrep™ model 8000D mill. A 316 stainless steel ball mill vial and four 7 mm diameter tungsten carbide balls were used in the grinding process, which resulted in formation of a copper silicide powder with the average particle size of <150 µm, as determined by sieving (80 mesh sieve). A tungsten carbide ball mill vial and two 10 mm tungsten carbide bearings were also used in the grinding process.

The reaction apparatus included a gas flow preparation system, an 18" long (0.25" outer diameter and 0.15" diameter) quartz reactor tube, a tube furnace, an in-line gas sampling valve, and a GC equipped with mass-selective and thermal conductivity detectors. The gas flow preparation system allowed for an individual supply or pre-mixing of any of four gases or gas streams: H$_2$, Ar, dimethyl ether, and CO$_2$. The gas flows were controlled in the 2-100 sccm range for Ar and H$_2$, in the 1-50 sccm range for CO$_2$, and in the 1-10 range for Me$_2$O by using Brooks 5850 (for Ar and H$_2$) and Brooks 7950 (for CO$_2$) and Brooks GF080CXX thermal mass flow controllers, respectively. The mass flow controllers were equipped with metal seal valves and pre-calibrated for the specific gases by the manufacturer. Other alkyl ethers could be injected into the reactor tube via a 1/8" tube which was fed by a pump. The pressure of the gas flow entering the reactor was monitored by a 1-2000 psi pressure range capacitance pressure transducer (0.1 psi accuracy) powered via an electronic readout unit. All gas lines between the mass flow controllers and reactor inlet were made of stainless steel tubing; all gas valves were of a ball-type lubricant-free from Swagelok®; all gas connectors, joints and other flow components were of a Swagelok® tube type. The Parker® fluoro-polymer compression fittings were used to connect the quartz reactor tube to the gas preparation system and the sampling valve. The front portion of the reactor before the furnace and the area between the ends of the furnace were heated to 110° C. by heating tape controlled by two AC current variable transformers. A Lindberg/Blue M HTF55122A type furnace with the 0-1200° C. temperature range was used for the reactor temperature control. The furnace PID controller allowed for better than 0.5° C. temperature stability at 350° C., which was the reaction temperature used in these examples. The reactor tube outlet was connected to the in-line heated six-way sampling valve (Valco Vici®). The 1/16" O.D. stainless steel tube gas sampling loop attached to the valve was of 100 µl volume. The temperature of the valve and the loop was maintained at 200° C. The sampling valve outlet was connected to a glass bubbler filled with a mineral oil. The outlet of the bubbler was vented to atmosphere. The gas lines between the reactor unit and sampling valve and between the sample valve and the bubbler were heated by an electric heating tape. The temperature of the heated tape maintained at 130° C. by an AC current variable transformer.

The quantitative analysis of the reactor effluent was performed chromatographically by using the thermal conductivity detector (TCD) of the on-line gas GC instrument. The identity of the compounds in the reactor effluent was determined using the mass-selective (MS) detector. The GC/MS instrument was an Agilent 5795 GC attached to a 5975C MS. The preferred GC conditions were to use 30 meter SPB-octyl LTM columns initially at 50° C. and then ramping to 150° C. (100° C./min) while holding for several minutes and cooling back to 25° C. Pressure was set at 15 psi and a flow rate of around 40 ml/min. A 25:1 split flow ratio was used, and data were collected for 10-13 minutes per sampling run (depending on substrate). A 200° C. inlet temperature was used to allow higher boilers to reach the column. Injections were performed automatically using the 6-way valve.

In each trial, 3.09 g of a copper silicide that contained 0.25 g of silicon was placed in the ¼" quartz tube and this was placed in the reactor. The copper silicide was treated 300° C. under a flow of 20 sccm hydrogen for 30 minutes to remove any surface oxides that may have been present. Then, the reactor was heated at 350° C. under a flow of 5 sccm CO$_2$. Next, a flow of 3 sccm dimethyl ether was introduced to the reactor. The reaction progress was monitored by sampling the gas effluent periodically as described above. The TCD integral values of the reaction intermediates were evaluated to determine values such as selectivity, rate, conversion, and silicon removed. Table 1 (see last page of this application) shows the product selectivities and dimethyl ether conversion to silanes (mol %) and the rate of reaction (µmol/min).

In an additional trial, a sample of silicon (HSC 890 from Hemlock Semiconductor Corporation of Hemlock, Mich., U.S.A.) was combined with copper catalyst (CuCl) and tin promoter (SnCl$_2$) to form a contact mass. In each trial, 1 g of the contact mass was placed in the ¼" quartz tube and this was placed in the reactor. The contact mass was heated for 1 hour under 5 sccm of hydrogen at 400° C. to activate it. Then, the reactor was cooled to 350° C. under a flow of 5 sccm $CO_2$. Next, a flow of 3 sccm dimethyl ether was introduced to the reactor. The reaction progress was monitored by sampling the gas effluent periodically as described above. The TCD integral values of the reaction intermediates were evaluated to determine values such as selectivity, rate, conversion, and silicon removed. Table 1 (see last page of this application) shows the product selectivities and dimethyl ether conversion to silanes (mol %) and the rate of reaction (μmol/min).

INDUSTRIAL APPLICABILITY

The method described herein is capable of preparing alkylalkoxysilanes without need of preparation of a hydrocarbylhalosilane first and then converting the hydrocarbylhalosilane via, e.g., an alkoxylation reaction. The method conditions are similar to those of Rochow-Muller Direct Process, except with different starting materials. Without wishing to be bound by theory, it is thought that the method described herein is a more environmentally friendly approach (as compared to the previous processes) that reduces or avoids the need to use halogenated compounds such as halosilanes, hydrogen halides, and/or halogenated hydrocarbons (such as methyl chloride) which are considered less environmentally friendly agents (due to the subsequent HCl generation upon preparation of siloxane polymers). Therefore, the present method may be performed without adding any halide of formula R'X (where R' is hydrogen or a hydrocarbyl group and X is a halogen atom as described above) during step 1), as recited in claim 1. Furthermore, the present method may be performed without adding halosilanes during step 1), which can also result in HCl generation upon preparation of siloxane polymers.

Embodiments of the Invention

In a first embodiment, a method includes:
1) heating at a temperature of 150° C. to 400° C., ingredients including
   a) an alkyl ether and carbon dioxide, and
   b) a source of silicon and catalyst;
thereby forming a reaction product including a alkylalkoxysilane of formula $R_{(4-a)}Si(OR)_a$, where each R is independently an alkyl group and subscript a is 1 to 4. In this embodiment, the ingredients may be free of halogenated compounds and/or the method may be performed in the absence of halogenated compounds.

In a second embodiment, the method of the first embodiment is performed where the hydrocarbyl ether is selected from dimethyl ether, diethyl ether, or methyl phenyl ether.

In a third embodiment, the method of the first embodiment is performed, where the catalyst includes copper.

In a fourth embodiment, the method of the first embodiment is performed, where ingredient b) is a copper silicide.

In a fifth embodiment, the method of the fourth embodiment is performed, where the copper silicide is a binary copper silicide.

In a sixth embodiment, the method of the fourth embodiment is performed, where the copper silicide is $Cu_5Si$.

In a seventh embodiment, the method of the fourth embodiment is performed, where the copper silicide includes copper, silicon and a metal selected from the group consisting of aluminium, tin, titanium, and combinations of two or more of aluminium, tin, and titanium.

In an eighth embodiment, the method of the first embodiment is performed, where ingredient b) includes a contact mass including silicon and copper.

In a ninth embodiment, in the method of the eighth embodiment, the ingredients further include d) a promoter.

In a tenth embodiment, in the method of the first embodiment, the ingredients further include d) a promoter.

In an eleventh embodiment, in the method of the tenth embodiment, the promoter includes aluminium, tin, titanium, or a combination of two or more of aluminium, tin, and titanium.

In a twelfth embodiment, in the method of the ninth embodiment, the promoter includes aluminium, tin, titanium, or a combination of two or more of aluminium, tin, and titanium.

In a thirteenth embodiment, the method of the first embodiment further includes adding c) hydrogen during step 1).

In a fourteenth embodiment, in the method of the first embodiment, each R is methyl, ethyl or phenyl.

In a fifteenth embodiment, in the method of the first embodiment, the alkylalkoxysilane includes methyltrimethoxysilane, dimethyldimethoxysilane, trimethylmethoxysilane, and tetramethoxysilane.

In a sixteenth embodiment, in the method of the first embodiment the reaction product includes a alkylalkoxysilane of formula $R_2Si(OR)_2$.

In a seventeenth embodiment, the method of the first embodiment further includes purging and/or treating ingredient b) before step 1).

In an eighteenth embodiment, the method of the first embodiment further includes: 2) recovering the alkylalkoxysilane from the reaction product.

The Brief Summary of the Invention and the Abstract are hereby incorporated by reference. All ratios, percentages, and other amounts are by weight, unless otherwise indicated. The articles 'a', 'an', and 'the' each refer to one or more, unless otherwise indicated by the context of the specification. Abbreviations used herein are defined in Table A, below.

TABLE A

| Abbrev. | Word |
| --- | --- |
| % | Percent |
| AC | alternating current |
| Bu | "Bu" means butyl and includes branched and linear structures such as iso-butyl and, n-butyl. |
| ° C. | degrees Celsius |
| Et | Ethyl |
| GC | gas chromatograph and/or gas chromatography |
| ICP-AES | inductively coupled plasma atomic emission spectroscopy |
| ICP-MS | inductively coupled plasma mass spectrometry |
| kPa | Kilopascals |
| Me | Methyl |
| mg | Milligram |
| mL | Milliliters |
| mol | mole |
| Ph | Phenyl |
| Pr | "Pr" means propyl and includes branched and linear structures such as iso-propyl and, n-propyl. |
| s | Seconds |
| sccm | standard cubic centimeters per minute |
| TCD | thermal conductivity detector |
| μmol | micromole |
| Vi | Vinyl |

"Metallic" means that the metal has an oxidation number of zero.

"Purging" means to introduce a gas stream into a container to remove unwanted materials.

"Treating" means to introduce a gas stream into a container to pre-treat a component before contacting the component with another component. Treating includes contacting ingredient b) with the gas stream to reduce or otherwise activate ingredient b) before contacting it with ingredient a).

"Residence time" means the time which a component takes to pass through a reactor system in a continuous process, or the time a component spends in the reactor in a batch process. For example, residence time in step 1) refers to the time during which one reactor volume of ingredient b) makes contact ingredient a) as ingredient b) passes through the reactor system in a continuous process or during which ingredient b) is placed within the reactor in a batch process. Alternatively, residence time may refer to the time for one reactor volume of reactive gas to pass through a reactor charged with ingredient b). (E.g., residence time includes the time for one reactor volume of ingredient a) to pass through a reactor charged with ingredient b).

The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range.

With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination with any other member or members of the group, and each member provides adequate support for specific embodiments within the scope of the appended claims. For example, disclosure of the Markush group: alkyl, alkenyl and aryl includes the member alkyl individually; the subgroup alkyl and aryl; and any other individual member and subgroup subsumed therein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. The enumerated ranges and subranges sufficiently describe and enable various embodiments of the present disclosure, and such ranges and subranges may be further delineated into relevant halves, thirds, quarters, fifths, and so on. As just one example, a range "of 150 to 400" may be further delineated into a lower third, i.e., from 150 to 233, a middle third, i.e., from 234 to 316, and an upper third, i.e., from 317 to 400, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 0.1%" inherently includes a subrange from 0.1% to 35%, a subrange from 10% to 25%, a subrange from 23% to 30%, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range of "1 to 9" includes various individual integers, such as 3, as well as individual numbers including a decimal point (or fraction), such as 4.1, which may be relied upon and provide adequate support for specific embodiments within the scope of the appended claims.

The subject matter of all combinations of independent and dependent claims, both singly and multiply dependent, is expressly contemplated but is not described in detail for the sake of brevity. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

TABLE 1

Direct reaction of Alfa Aesar $Cu_5Si$ or a contact mass dimethyl ether after 70 minutes at $T = 350°$ C., $P = 1$ atm. All values in (mol. %) except for the rate, which is in (μmol/min).

| b) catalyzed source of silicon | $Me_2HSiOMe$ | $Me_3SiOMe$ | $MeHSi(OMe)_2$ | $Me_2Si(OMe)_2$ | $MeSi(OMe)_3$ | TMOS | "SiOSi" | DME Conv. to Si | Int. Si Prod. Rate |
|---|---|---|---|---|---|---|---|---|---|
| Contact mass | 0 | 0 | 0 | 52 | 26 | 13 | 9 | 0.1 | 0.4 |
| $Cu_5Si$ | 0 | 11 | 0 | 72 | 7 | 1 | 8 | 0.9 | 3.2 |

The invention claimed is:

1. A method forming a reaction product comprising an alkylalkoxysilane comprises:
   1) heating at a temperature of 150° C. to 400° C., ingredients comprising
      a) an alkyl ether and carbon dioxide, and
      b) a source of silicon and catalyst;
   thereby forming the reaction product comprising the alkylalkoxysilane, where the alkylalkoxysilane has formula $R_{(4-a)}Si(OR)_a$, where each R is independently an alkyl group and subscript a is 1 to 4.

2. The method of claim 1, where the hydrocarbyl ether is selected from dimethyl ether, diethyl ether, or methyl ethyl ether.

3. The method of claim 2, where the catalyst comprises copper.

4. The method of claim 2, where ingredient b) is a copper silicide.

5. The method of claim 2, where ingredient b) comprises a contact mass comprising silicon and copper.

6. The method of claim 1, where the catalyst comprises copper.

7. The method of claim 1, where ingredient b) is a copper silicide.

8. The method of claim 7, where the copper silicide is a binary copper silicide.

9. The method of claim 7, where the copper silicide is $Cu_5Si$.

10. The method of claim 7, where the copper silicide comprises copper, silicon and an additional metal selected from the group consisting of aluminium, tin, titanium, and combinations of two or more of aluminium, tin, and titanium.

11. The method of claim 1, where ingredient b) comprises a contact mass comprising silicon and copper.

12. The method of claim 11, further comprising adding d) a promoter.

13. The method of claim 12, where the promoter comprises aluminium, tin, titanium, or a combination of two or more of aluminium, tin, and titanium.

14. The method of claim 1, further comprising adding c) hydrogen during step 1).

15. The method of claim 1, where each R is methyl, ethyl or phenyl.

16. The method of claim 1, where the alkylalkoxysilane comprises methyltrimethoxysilane, dimethyldimethoxysilane, trimethylmethoxysilane, and tetramethoxysilane.

17. The method of claim 1, where the reaction product comprises an alkylalkoxysilane of formula $R_2Si(OR)_2$.

18. The method of claim 1, further comprising purging and/or treating ingredient b) before step 1).

* * * * *